United States Patent
Kim et al.

(10) Patent No.: US 8,947,264 B2
(45) Date of Patent: Feb. 3, 2015

(54) STRUCTURE FOR CROSSWALK PROVIDING BOTH ADVERTISING EFFECT AND PEDESTRIAN SAFETY

(76) Inventors: Yun Ho Kim, Anyang-si (KR); Jae Cheol Heo, Naebu-ri (KR)

(*) Notice: Subject to any disclaimer, the term of this patent is extended or adjusted under 35 U.S.C. 154(b) by 802 days.

(21) Appl. No.: 13/200,516

(22) Filed: Sep. 23, 2011

(65) Prior Publication Data

US 2012/0081549 A1 Apr. 5, 2012

(30) Foreign Application Priority Data

Oct. 1, 2010 (KR) .................. 20-2010-0010171 U
Nov. 1, 2010 (KR) .................. 20-2010-0011215 U

(51) Int. Cl.
*G08G 1/095* (2006.01)
*G02B 26/12* (2006.01)
*G02B 26/10* (2006.01)
*G09F 15/00* (2006.01)
*G06Q 30/02* (2012.01)

(52) U.S. Cl.
CPC .............. *G08G 1/095* (2013.01); *G02B 26/124* (2013.01); *G02B 26/12* (2013.01); *G02B 26/10* (2013.01); *G09F 15/00* (2013.01); *G06Q 30/0241* (2013.01)
USPC .......................................... 340/944; 348/148

(58) Field of Classification Search
CPC ..... G06Q 30/0241; G08G 1/095; G09F 15/00
USPC .............................. 340/944; 348/148, E7.085
See application file for complete search history.

(56) References Cited

U.S. PATENT DOCUMENTS

| | | | | |
|---|---|---|---|---|
| 4,075,797 A | * | 2/1978 | Shaw | ................................ 52/74 |
| 2005/0068765 A1 | * | 3/2005 | Ertze Encinas | ............... 362/183 |
| 2005/0128105 A1 | * | 6/2005 | Green et al. | .................. 340/944 |
| 2006/0092491 A1 | * | 5/2006 | Wang | ............................. 359/196 |

FOREIGN PATENT DOCUMENTS

| | | |
|---|---|---|
| KR | 20-2003-0032866 | 6/2004 |
| KR | 10-2009-0088664 | 8/2009 |
| KR | 20-2011-000308 | 1/2011 |

* cited by examiner

*Primary Examiner* — Sath V Perungavoor
*Assistant Examiner* — Dakshesh Parikh
(74) *Attorney, Agent, or Firm* — D. Peter Hochberg; Sean F. Mellino; Richard A. Wolf

(57) ABSTRACT

A structure for a crosswalk providing both an advertising effect and pedestrian safety. A first support is erected vertically from a center of an entrance of a crosswalk. A second support is disposed parallel to and at a predetermined interval from the first support. The first and second supports have the same shape. A respective inner end of first steel members is fixed to an upper end of the first support, and outer ends of the first steel members extend perpendicularly to the direction of the crosswalk. Second steel members are disposed parallel to and at a predetermined interval from the first steel members. The first and second steel members have the same shape. A laser curtain beam radiating device is disposed on an underside of an outer end of one of the first and second steel members, and radiates a laser curtain beam in the direction of the crosswalk.

10 Claims, 3 Drawing Sheets

US 8,947,264 B2

STRUCTURE FOR CROSSWALK PROVIDING BOTH ADVERTISING EFFECT AND PEDESTRIAN SAFETY

CROSS-REFERENCE TO RELATED APPLICATIONS

This application claims foreign priority based on Korean Patent Application Serial No. 20-2010-0010171 filed Oct. 1, 2010 and Korean Patent Application Serial No. 20-2010-0011215 filed Nov. 1, 2010, the contents of which are incorporated herein by reference in their entirety.

BACKGROUND OF THE INVENTION

1. Field of the Invention

The present invention relates, in general, to a structure for a crosswalk and, more particularly, to a structure for a crosswalk that can maximize the effect of an advertisement while ensuring the safety of pedestrians.

2. Description of the Prior Art

Generally, a traffic signal for pedestrians and a traffic signal for drivers are disposed at a crosswalk. When the light for pedestrians is turned green and the light for drivers is turned red, pedestrians can safely cross the crosswalk.

However, some drivers sometimes do not stop in front of the crosswalk but illegally go over the crosswalk when no pedestrians are crossing the crosswalk even if the light for pedestrians is turned green.

In this case, it might still be safe if a driver illegally went over the crosswalk in the daytime because the driver can easily see a pedestrian who is crossing the crosswalk and thus can avoid an accident. However, in the night or when there are dark weather conditions because of snow and/or rain, it is rather difficult for a driver to see a pedestrian who is going over the crosswalk. Consequently, there is a problem in that accidents frequently occur at the crosswalk in the night or when there are dark weather conditions because of snow and/or rain.

In particular, vehicles frequently cause accidents at crosswalks in front of elementary schools or crowded crosswalks at night when the vehicles go over the crosswalks without obeying a signal, because it is difficult to see a person at night.

In addition to the above-described aspect, a description is given of a billboard that is widely popularized. A billboard of the related art is mainly disposed in public places, such as a building, a bus stop and a subway, in order to maximize the effect of an advertisement.

In an example, billboards, which are installed in places such as the roof of a building, are far from the sight of pedestrians and thus may not easily achieve the advertising effect because they are not close to pedestrians. As an alternative, many billboards are installed in places, such as bus stops or subways. These billboards have an advantage in that they can be within the range of sight of pedestrians and thus maximize the effect of an advertisement compared to those installed on roofs of buildings.

Accordingly, it may be preferable that billboards be installed in places, such as bus stops and subways. However, any billboards meant for a pedestrian who is walking on a crosswalk have not so far been installed. This is because there may be an insufficient space and an insufficient need to install billboards on crosswalks.

SUMMARY OF THE INVENTION

Accordingly, the present invention has been made keeping in mind the above problems occurring in the related art, and the present invention is intended to propose a structure for a crosswalk which is devised to radiate light onto a crosswalk in order to inform vehicles that they are prohibited from going over the crosswalk when the light for pedestrians is turned green, and which is provided with a means for monitoring the passage of vehicles at any time in order to ensure pedestrians, in particular, children safely walk on the crosswalk at night or when it is snowing or raining, so that accidents can be significantly decreased.

The present invention is also intended to propose a structure for a crosswalk that can ensure the safety of pedestrians as described above while achieving the effect of advertising to pedestrians who are standing before the crosswalk.

In order to achieve the above object, according to one aspect of the present invention, there is provided a structure for a crosswalk providing both an advertising effect and pedestrian safety.

The structure for a crosswalk includes a first support erected vertically from a ground that is positioned in a central portion of an entrance of a crosswalk. A second support is disposed parallel to and at a predetermined interval from the first support. The first and the second supports have the same shape. A respective inner end of first steel members is fixed to an upper end portion of a corresponding side of the first support, and outer ends of the first steel members extend perpendicularly to a direction in which pedestrians cross the crosswalk. Second steel members are disposed parallel to and at a predetermined interval from the first steel members. The first and second steel members have the same shape. A laser curtain beam radiating device is disposed on an underside of an outer end of one of the first and second steel members. The laser curtain beam radiating device radiates a laser curtain beam in the direction in which pedestrians cross the crosswalk.

The structure for a crosswalk may further include fixing wire members. A respective outer end of the fixing wire members may be fixed to an upper portion of a corresponding outer end of the first and second steel members, and a respective inner end of the fixing wire members may be fixed to a corresponding upper end portion of the first and second supports.

Each of the fixing wire members may include a fixing wire and fixing bars, the fixing bars fixing opposite ends of the fixing wire.

The structure for a crosswalk may further include a roof covering that covers the first and second steel members to block light and rain and is made of a tempered glass.

The laser curtain radiating device may radiate the laser curtain beam only when a pedestrian signal and a luminance signal are within preset range as a result of checking the pedestrian signal and the luminance signal.

The structure for a crosswalk may further include an advertisement device for displaying text information and image information for an advertisement on an inner surface thereof. Opposite edges of the advertisement device may be fixed to corresponding sides of the first and second supports that face each other.

The advertisement device may display still text information and still image information, or display real-time text information and dynamic image information transmitted from an outside.

In addition, it is preferable that the first support, the second support, the first steel members and the second steel members be made of a stainless steel.

Furthermore, the structure for a crosswalk may further include an unmanned camera disposed on a lower portion of an outer end of one of the first and second steel members that is opposite a position in which the laser curtain radiating device is disposed. The unmanned camera may photograph a passage of pedestrians and vehicles on the crosswalk.

According to embodiments of the present invention, the laser curtain beam radiating device that can radiate a laser curtain beam is provided at the entrance of a crosswalk so that the laser curtain beam can help a driver stop a vehicle even if the driver fails to see a pedestrian who is walking on the crosswalk, thereby preventing a pedestrian-car accident. In particular, this effect can be maximized at crosswalks for children in front of elementary schools and at crowded downtown crosswalks.

In addition, the unmanned camera is provided in order to monitor a vehicle that drives over a crosswalk without obeying a laser curtain beam when the light for pedestrians is turned green. This can warn drivers that they would be punished for their disobedience of the traffic signal when they pass the laser curtain, thereby greatly contributing to traffic order and safety.

Furthermore, in addition to the laser curtain beam radiating device, the advertisement device is provided at the entrance of the crosswalk in order to directly deliver an image of an advertisement to many pedestrians who are standing before the crosswalk, thereby maximizing the effects of advertising.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF THE PREFERRED EMBODIMENTS

Figure 1:
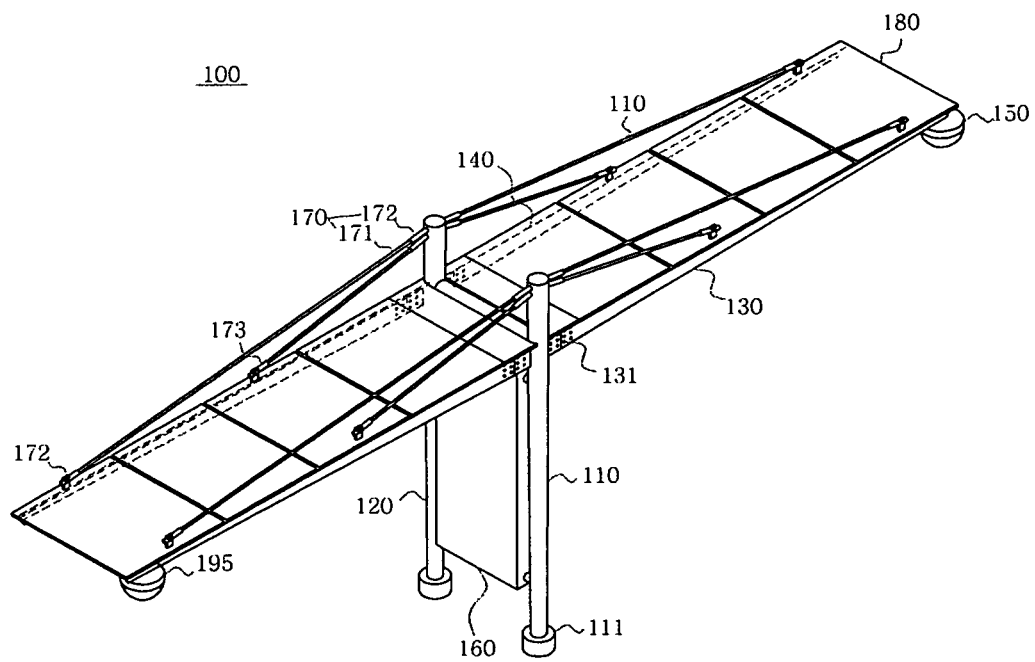
FIG. 1 is a perspective view illustrating a structure for a crosswalk according to an embodiment of the present invention.

Reference will now be made in greater detail to a preferred embodiment of the invention, an example of which is illustrated in the accompanying drawings, so that a person having ordinary skill in the art to which the present invention relates can easily put the present invention into practice. Wherever possible, the same reference numerals will be used throughout the drawings and the description to refer to the same or like parts.

Figure 2:
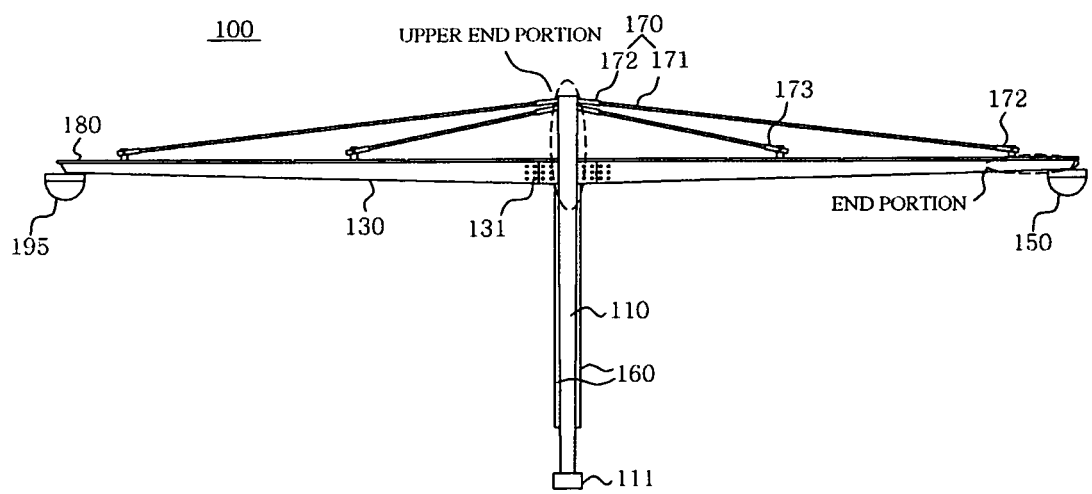
FIG. 2 is a front elevation view illustrating the structure for a crosswalk according to an embodiment of the present invention.
Figure 3:
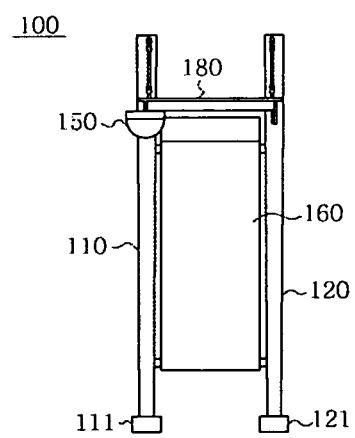
FIG. 3 is a right-side elevation view illustrating the structure for a crosswalk according to an embodiment of the present invention.

FIG. 1 is a perspective view illustrating a structure for a crosswalk 100 according to an embodiment of the present invention, FIG. 2 is a front elevation view illustrating the structure for a crosswalk 100 according to an embodiment of the present invention, and FIG. 3 is a right-side elevation view illustrating the structure for a crosswalk 100 according to an embodiment of the present invention.

As shown in the figures, the structure for a crosswalk 100 according to an embodiment of the present invention is a structure providing both advertising effects and pedestrian safety, and includes a first support 110, a second support 120, first steel members 130, second steel members 140, a laser curtain radiating device 150, an advertisement device 160, fixing wire members 170 and an unmanned camera 195.

First, the first support 110 of this embodiment is configured such that it erects vertically from the ground positioned in the central portion of the entrance of a crosswalk, and functions as a pillar. The first support 110 also has a circular base 111 that is wider than the pillar in order to facilitate contact with the ground and fixing to the ground. The base 111 extends from the bottom end of the pillar, and is fixedly in contact with the ground, thereby forming the lower end portion of the first support 110. The first support 110 is preferably made of, but not limited to, a stainless steel material that is rarely subjected to thermal deformation or rusting when in a hostile environment of subject to extreme weather change, and has excellent strength.

The second support 120 of this embodiment is a structure that is disposed opposite the direction in which the crossing extends about the first support 110. The second support 120 is arranged parallel to and at a predetermined interval from the above-described first support 110, has the same configuration and is made of the same material as the first support 110, and functions as a pillar. In addition, the second support 120 also has a base 121 on the bottom thereof, like the first support 110.

Each of the first steel members 130 of this embodiment is configured such that the inner end is fixed to an either side of the first support 110 that is adjacent to the upper end of the first support 110 and the outer end extends perpendicularly to the direction in which pedestrians move. The first steel members 130 are preferably of a structure that is separated into two parts even if they can be fabricated integrally. The first steel members 130, which are separated into the two parts, can be coupled with each other via fastening means 131, such as bolts, nuts, hexagonal wrench bolts, and the like, at the point where they come together. In addition, in terms of the material of the first steel members 130, they may be made of the same stainless steel material as the first and second supports 110 and 120, as described above.

The second steel members 140 of this embodiment face the first steel members 130 at predetermined intervals, and have a structure that is the same as that of the first steel members 130. The second steel members 140 may also have a structure that is separated into two parts, like the first steel members 130.

The laser curtain radiating device 150 of this embodiment serves to radiate a laser curtain beam in the direction in which the crosswalk extends in order to ensure that pedestrians can safely cross the crosswalk. For this purpose, the laser curtain radiating device 150 is mounted on the underside of the outer end of the first or second steel member 130 or 140. The exact position of the laser curtain radiating device 150 may vary depending on the direction in which pedestrians cross the crosswalk. Furthermore, the laser curtain radiating device 150 may be positioned on the underside of the outer end of the steel member, which is to the left of the direction in which pedestrians move when they cross the crosswalk.

However, the position of the laser curtain radiating device 150 is not limited to the above illustration, but the laser curtain radiating device 150 can be disposed on any other positions of the first and second steel members 130 and 140 as long as it can easily radiate a laser curtain beam onto the crosswalk.

The laser curtain radiating device 150 may include a pedestrian signal detection module, a luminance signal detection module, a signal comparing module, and a beam radiating module. The pedestrian signal detection module detects a pedestrian signal generated from a traffic signal for pedestrians. The luminance signal detection module receives a luminance signal as a result of measuring brightness from a luminance sensor. The signal comparing module receives the pedestrian signal and the luminance signal, and compares them with respective preset ranges. The beam radiating module radiates a laser curtain beam that is generated from a laser curtain sensor when the result of a comparison made by signal comparing module is satisfactory.

Accordingly, drivers can see the laser curtain beam that is radiated irrespective of the crossing of pedestrians and thus unconditionally stop in front of the crosswalk. This consequently makes it possible to realize the purpose of the present invention which is to ensure the safety of pedestrians irrespective of their crossing.

Although this embodiment is described as being limited to the laser curtain radiating device 150 that radiates a laser curtain beam, a laser beam having the form of a ray of light may be radiated instead of the laser curtain beam.

The advertisement device 160 of this embodiment serves to display text information and image information of an advertisement on the inner surface(s) thereof, with both edges ends thereof being fixed to opposite sides of the first and second supports 110 and 120. The advertisement device 160 may display not only still text and image information of an advertisement, but also dynamic text and image information of an advertisement.

In addition, the advertisement device 160 of this embodiment may display real-time text information and dynamic image information, which are not advertising information but are related to traffic information, received from the outside. Specifically, the advertisement device 160 of this embodiment may interwork with an external traffic information system (not shown) to receive real-time traffic situations and news from the traffic information system and display them as text or image information in real time.

As the advertisement device 160 of this embodiment may be positioned on the entrance of a downtown crosswalk, which a number of pedestrians cross, in order to maximize the effect of advertising to pedestrians who cross the crosswalk and to contribute to decorating the appearance of the city. In addition, as shown in FIG. 2, the advertisement device 160 may be fixed such that its opposite sides protrude beyond the sides of the first support 110, so that it can display an advertisement to both a pedestrian who is in front of and a pedestrian who is to the rear of the advertisement device 160.

The fixing wire members 170 of this embodiment hold the first and second steel members 130 and 140, which are fixed to the first and second supports 110 and 120, so that the first and second steel members 130 and 140 are not shaken by the wind. The fixing wire members 170 also serve to absorb any forces generated from the first and second steel members 130 and 140.

In order to perform such functions, the fixing wire members 170 of this embodiment may include a plurality of fixing wire members. Specifically, a respective outer end of the fixing wire members 170 is fixed to an upper portion of a corresponding outer end of the first and second steel members 130 and 140, adjacent to the outer end, and a respective inner end of the fixing wire members 170 is fixed to a corresponding upper end portion of the first and second supports 110 and 120.

Describing the structure in greater detail, each of the fixing wire members 170 of this embodiment may include a fixing wire 171 and fixing bars 172, which fix opposite ends of the fixing wire 171. The fixing bars 172 include fixing bars that are fixedly disposed on the upper portions of the outer ends of the first and second steel members 130 and 140, adjacent to the outer ends, and fixing bars that are fixedly disposed on the upper end portions of the first and second supports 110 and 120. Here, each fixing bar 172 may be configured such that a fixing wire is inserted into the fixing bar 127 and is fixed to the inside of the fixing bar 127. Alternatively, the fixing bar 172 may be configured such that a fixing wire is fixed to the fixing bar from outside, using a fixing bolt or the like.

Unlike the foregoing structures, the fixing wire member 170 of this embodiment may also be configured such that the outer end is fixed to a respective upper portion of middle portions of the first and second steel members 130 and 140 and, as described above, the inner end is fixed to a corresponding upper end portion of the first and second supports 110 and 120. In this case, a fixing bar 173 may also be disposed on the corresponding upper portion of the middle portions of the first and second steel members 130 and 140. It is preferable to simultaneously provide both of the two structures.

Finally, the unmanned camera 195 of this embodiment is provided on the underside of the outer end of one of the first and second steel members 130 and 140 that are opposite the position in which the laser curtain radiating device 150 is provided. The unmanned camera 195 serves to photograph the passage of pedestrians and vehicles on the crosswalk. In an example, when the laser curtain radiating device 150 is provided on the underside of the outer end of the first steel member 130 that is provided on one side of the first support 110, the unmanned camera 195 may be provided on the underside of the outer end of the first steel member 130 that is provided on the other side of the first support 110. In addition, depending on the position of the laser curtain radiating device 150 on one of the second steel members 140, the unmanned camera 195 may also be provided on the opposite one of the second steel members 140.

Although the unmanned camera 195 of this embodiment has been described, in an example, as being provided on one of the steel members opposite the laser curtain radiating device 150 as shown in the figures, this is not intended to be limiting. Rather, the unmanned camera may be provided at any position as long as it can monitor the crosswalk.

Accordingly, when a green light for pedestrians is turned on and a laser curtain beam is radiated onto the crosswalk, the unmanned camera 195 of this embodiment may monitor vehicles that disregard the laser curtain beam and go over the crosswalk in order to further increase the safety of pedestrians.

Furthermore, there are various operating conditions of the unmanned camera 195 of this embodiment. For example, the unmanned camera 195 may be set to operate for 24 hours irrespective of the green light for pedestrians, to operate for a limited time, for example, at night time or in dark weather. However, it may be preferable for the unmanned camera to operate when the laser curtain beam is radiated.

In addition to the above-described structures, the structure for a crosswalk 100 of this embodiment may also include a roof covering 180, which will be described below in greater detail with reference to FIG. 4.

Figure 4:
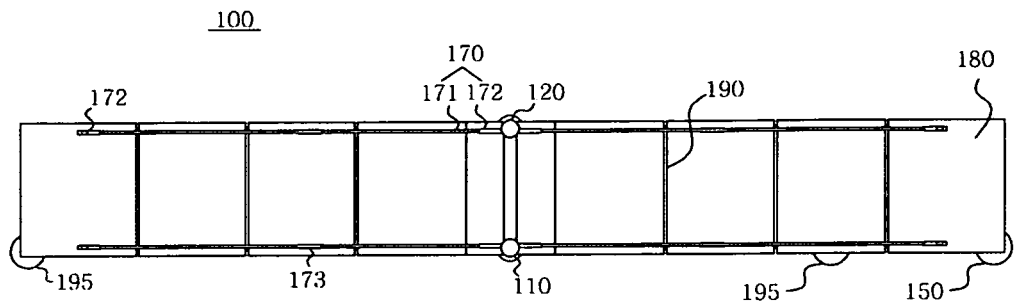
FIG. 4 is a top plan view illustrating a roof covering of the structure for a crosswalk according to an embodiment of the present invention.

FIG. 4 is a top plan view more-specifically illustrating the roof covering 180 of the structure for a crosswalk 100 of this embodiment, in which the structure for a crosswalk 100 shown in FIG. 1 to FIG. 3 is viewed from above.

As shown in FIG. 4, the roof covering 180 of the structure for a crosswalk 100 of this embodiment is configured such that it covers the upper portions of the first and second steel members 130 and 140 in order to block light and rain. The roof covering 180 is preferably made of a tempered glass that does not deform even under cold and hot weather conditions. However, this is not intended to be limiting.

In addition, as shown in FIG. 4, a plurality of auxiliary members 190 may also be provided between the first and second steel members 130 and 140 in order to prevent the first and second steel members 130 and 140 from shaking. Both ends of each auxiliary member 190 are fixed to one side of a corresponding first steel member 130 and one side of a corresponding second steel member 140.

Furthermore, as shown in FIG. 4, it can be found, in an example, that the first steel members 130 are symmetrical to each other about the first support 110, that the second steel members 140 are symmetrical to each other about the second support 120, and that the laser curtain radiating device 150 is positioned on the outer end of the right one of the first steel members 130.

Figure 5:
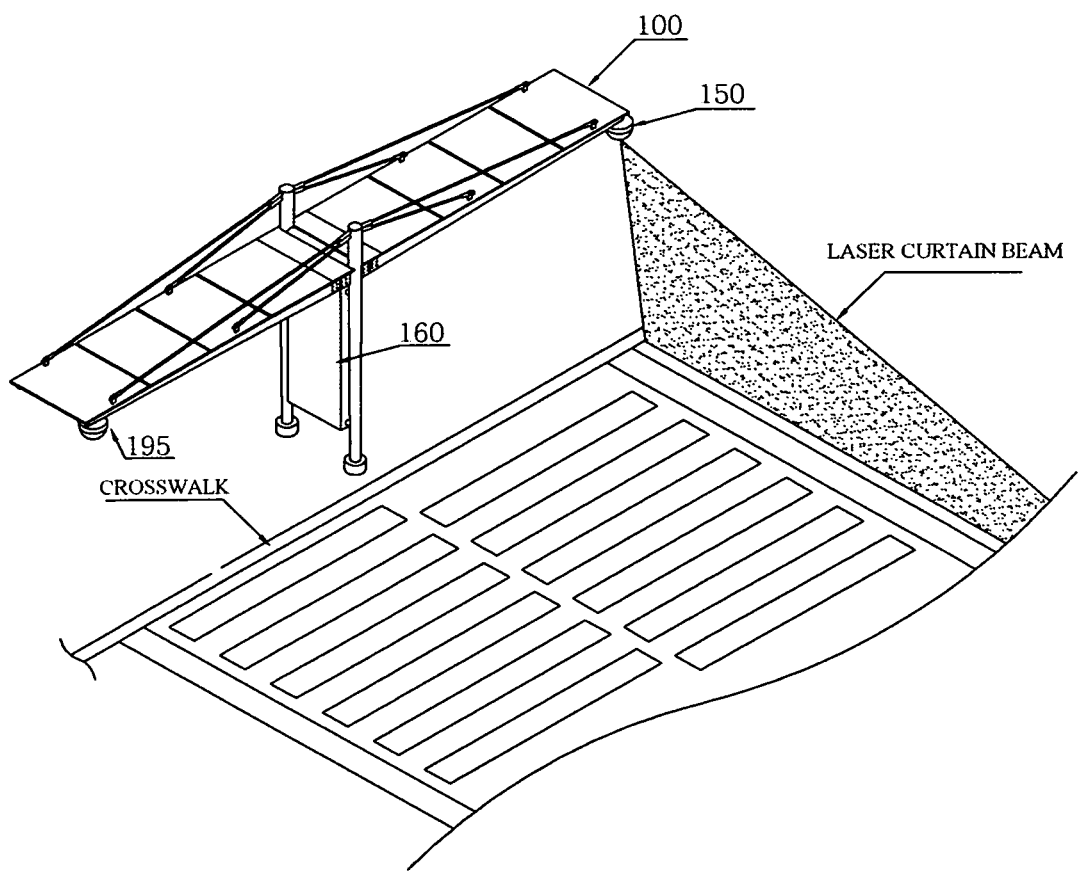
FIG. 5 illustrates the structure according to an embodiment of the present invention that radiates a laser curtain beam onto a crosswalk.

FIG. 5 illustrates the structure for a crosswalk 100 according to an embodiment of the present invention that radiates a laser curtain beam onto a crosswalk. This shows that the structure 100, as shown in FIG. 1 to FIG. 4, is actually radiating a laser curtain beam onto a crosswalk.

Although the exemplary embodiments of the present invention have been described for illustrative purposes, those skilled in the art will appreciate that various modifications, additions and substitutions are possible, without departing from the scope and spirit of the invention as disclosed in the accompanying claims. Therefore, it should be understood that the foregoing embodiments are exemplary only but not limiting in any aspects.

What is claimed is:

1. A structure for a crosswalk having a central portion, the structure for a crosswalk providing both an advertising effect and pedestrian safety, said structure for a crosswalk comprising:
   a first support erected vertically from a ground that is positioned in the central portion of an entrance of a crosswalk, said first support having an upper end portion;
   a second support disposed parallel to and at a predetermined interval from said first support, said first support and said second support having a same shape;
   at least one first steel member having an inner end and an outer end, said inner end of said at least one first steel member being fixed to said upper end portion of said first support, and said outer end of said at least one first steel member extending perpendicularly to a direction in which a pedestrian crosses the crosswalk;
   at least one second steel member having an inner end and an outer end, said at least one second steel member being disposed parallel to and at a predetermined interval from said at least one first steel member, said at least one first steel member and said at least one second steel member having a same shape; and
   a laser curtain beam radiating device disposed on said outer end of one of said at least one first steel member and said at least one second steel member, wherein said laser curtain beam radiating device radiates a laser curtain beam in the direction in which a pedestrian crosses the crosswalk.

2. The structure for a crosswalk according to claim 1, further comprising at least one fixing wire member having an outer end and an inner end, said outer end of said at least one fixing wire member being fixed to one of said at least one first steel member and said at least one second steel member, and said inner end of said at least one fixing wire member being fixed to one of said at least one first support and said at least one second support.

3. The structure for a crosswalk according to claim 2, wherein said at least one fixing wire member includes a fixing wire having opposite ends and at least two fixing bars, said at least two fixing bars being fixed on said opposite ends of said fixing wire.

4. The structure for a crosswalk according to claim 1, further comprising a roof covering for covering said at least one first steel member and said at least one second steel member, said roof covering comprising tempered glass for blocking light and rain.

5. The structure for a crosswalk according to claim 1, further comprising a pedestrian signal and a luminance signal, said pedestrian signal and said luminance signal having a preset range for checking said pedestrian signal and said luminance signal,
   wherein said laser curtain radiating device radiates the laser curtain beam only when said pedestrian signal and said luminance signal are within the preset range.

6. The structure for a crosswalk according to claim 1, further comprising an advertisement device having an inner surface and opposite edges, said advertising device displaying text information and image information for an advertisement on said inner surface of said advertising device,
   wherein one of said opposite edges of said advertisement device is fixed to said at least one first support and the other of said opposite edges of said advertisement device is fixed to said at least one second support.

7. The structure for a crosswalk according to claim 6, wherein said advertisement device is capable of displaying still text information and still image information.

8. The structure for a crosswalk according to claim 6, wherein the advertisement device is capable of displaying real-time text information and dynamic image information.

9. The structure for a crosswalk according to claim 1, wherein said at least one first support, said at least one second support, said at least one first steel member and said at least one second steel member comprise stainless steel.

10. The structure for a crosswalk according to claim 1, further comprising an unmanned camera for photographing a passage of pedestrians and vehicles on the crosswalk, said unmanned camera being disposed on the other of said at least one first steel member and said at least one second steel member on which said laser curtain radiating device is disposed.

* * * * *